Oct. 9, 1934.   R. C. SAWYER   1,976,196
AUTOMATIC COFFEE PERCOLATOR
Filed April 2, 1931
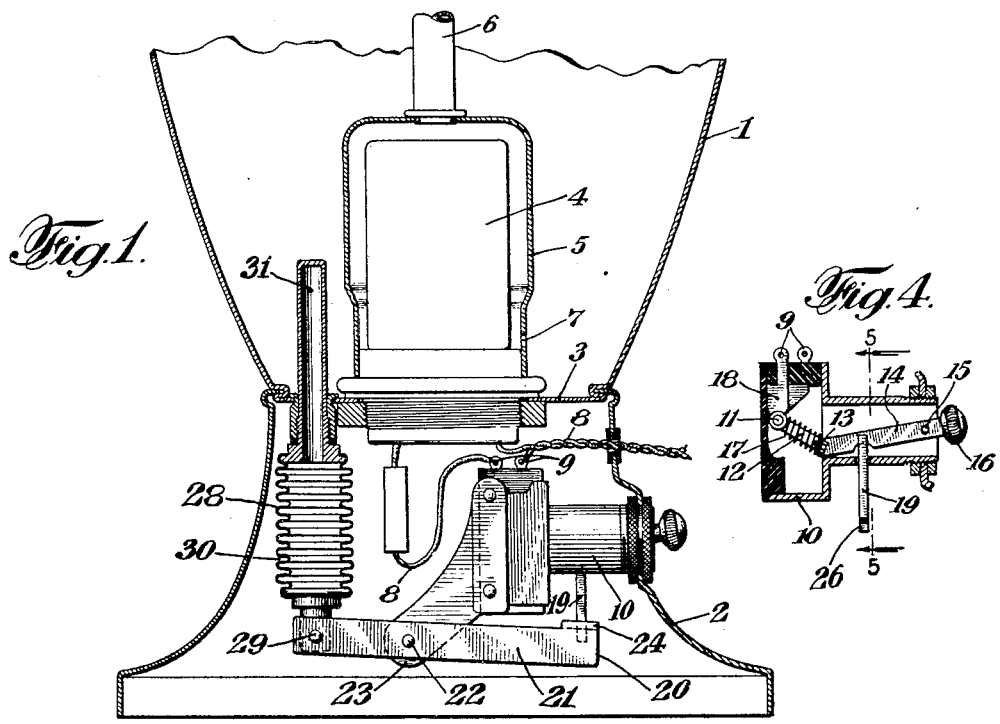
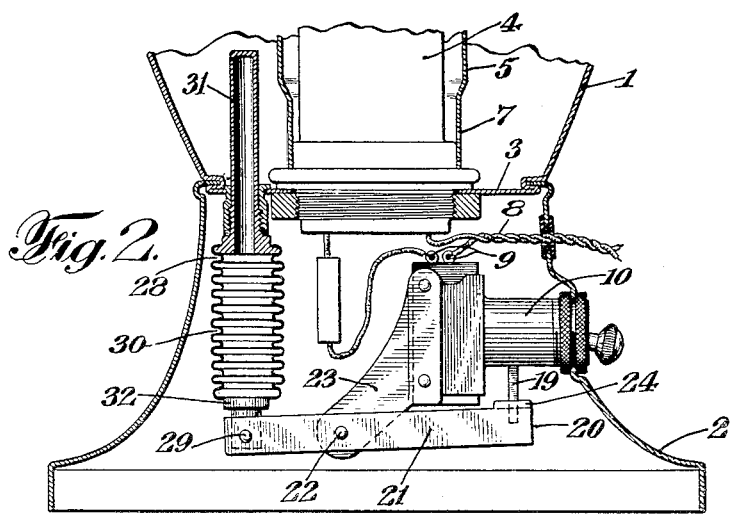
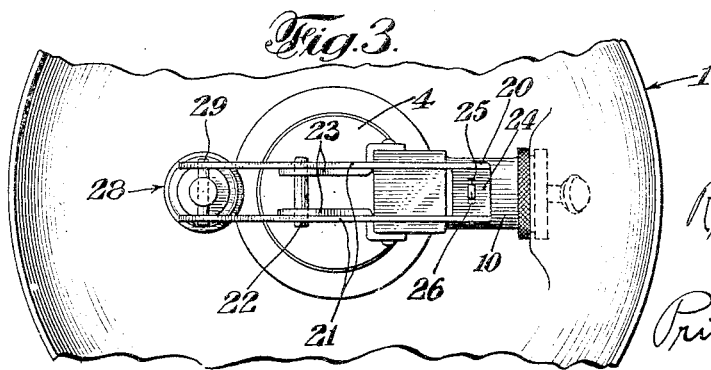
Rene C. Sawyer
INVENTOR
BY Prindle, Bean & Mann
ATTORNEYS Patented Oct. 9, 1934

1,976,196

UNITED STATES PATENT OFFICE 1,976,196

AUTOMATIC COFFEE PERCOLATOR

René C. Sawyer, Stratford, Conn., assignor to Bridgeport Brass Company, Bridgeport, Conn., a corporation of Connecticut Application April 2, 1931, Serial No. 527,148

10 Claims. (Cl. 219—43)

My invention relates to improvements in devices for heating liquids, such as coffee percolators and the like. In such devices which are operated by an electric heating element, it is quite difficult and also inconvenient to properly regulate the time of the percolating action with the result that the coffee or other liquid being cooked has not been heated sufficiently or has remained at a maximum temperature too long to obtain the best results.

My invention comprehends the provision of automatic means for opening the electric circuit through the heating element after the liquid has remained at a predetermined maximum temperature for a certain length of time so as to insure proper and complete cooking and prevent overcooking or boiling. This result is accomplished generally by means of an expansible and contractible bellows forming part of a hollow assembly which is filled with an expansible fluid subject to the heat of the liquid within the apparatus so that when the liquid has maintained a predetermined temperature for a certain period of time, the bellows will have expanded a sufficient distance to move a lever member and other cooperating parts to actuate the switch controlling the electric circuit to its "off" position. Of course, if it is desired to reheat the contents of the device, a switch is manually moved to its "on" position.

To the accomplishment of the foregoing and such other objects as may hereinafter appear, this invention consists in the construction, combination and arrangement of parts hereinafter described and then sought to be defined in the appended claims, reference being had to the accompanying drawing forming a part hereof and which shows, merely for the purpose of illustrative disclosure, a preferred embodiment of my invention, it being expressly understood, however, that various changes may be made in practice within the scope of the claims without digressing from my inventive idea.

In the drawing—

Figure 1 represents a vertical cross section through the lower portion of a coffee percolator constructed to embody my invention, the parts being shown in the "on" or heating position;

Figure 2 is a view similar to Figure 1, the parts being shown in the "off" or non-heating position;

Figure 3 is a bottom plan view of the device shown in Figures 1 and 2 to illustrate details of the connections between the thermostatic device and the toggle switch for operating the same;

Figure 4 is a vertical cross section through one form of toggle switch; and

Figure 5 is a vertical cross section taken substantially on line 5—5 of Figure 4 illustrating certain details of construction.

Referring now to the drawing, the numeral 1 designates the case or body of the percolator as a whole having the base portion 2 which is separated by the partition 3 from the body of the percolator. This partition 3 is adapted to receive a standard form of electric heating element 4 provided in a hood or cage 5 to the top of which is secured the percolating tube 6 whereby liquid within the body of the percolator is heated and forced upwardly through the tube 6, opening 7 being provided in the side of the hood 5 near the bottom to permit circulation of the liquid.

The heating element 4 is connected by means of suitable wires 8 to terminals 9 of a toggle switch 10, this switch may be constructed in various ways, one being shown in detail in the drawing. It includes the contact member 11 on the end of a switch arm 12 which has a slidable and pivotal connection 13 with the end of the actuating lever 14. This actuating lever 14 is pivoted to the casing as at 15 and provided with the operating button or head 16. A spring 17 is positioned around the switch arm 12 so as to cause a snapping action when the parts break contact. It is seen that when the button or head 16 is moved upwardly the contact member 11 is snapped upwardly into contact with the switch blades 18 to close the circuit through the heating element 4.

The principal feature of my invention is the provision of thermal control means for actuating the switch from its "on" position to its "off" position after the coffee or other liquid in the percolator has attained a predetermined temperature and remained at this temperature for a definite length of time. To that end the actuating arm 14 of the switch is connected by means of an actuating link 19 to the actuating lever member 20. This lever member is preferably formed with two spaced parallel arms 21 which are pivoted as at 22 to suitable supports or brackets or ears 23 depending from the toggle switch casing 10 and the rear end of the lever member 20 is provided with the platform 24 which is slotted as at 25 to slidably receive the reduced end 26 of the actuating link 19. This reduced end provides shoulders 27 which abut the platform 24 and are adapted to form an operative connection between the link 19 and the lever member 20 so that when the switch arm 14 is moved down the lever member 20 will be moved and when the lever member 20 is moved upwardly the switch arm 14 will be moved.

This lever member 20 is in turn in operative connection with the thermal control and operating member which is designated generally by the numeral 28, the lever member 20 being pivotally connected as at 29 to the lower end of the same. This thermal control member 28 includes the expansible and contractible bellows member 30 to the top of which is secured an elongated tube 31 having its upper end closed. This tube has a fluid tight connection with the partition 3 and the upper portion of the tube is positioned within the body 1 of the percolator so as to be in contact with the liquid contained therein. The bellows member 30 is positioned in the base 2 of the device and beneath the case or body 1 and is, therefore, not in direct contact with the liquid in the case or body 1. Some time will be consumed in transferring heat from tube 31 to bellows member 30 in order to expand the bellows member to operate the switch. This time interval is one of the factors which govern the time period of cooking or boiling. The bellows member 30 is provided with a head element 32 at its lower end to receive the pivot member 29 for connecting the lever member 20 thereto.

The bellows 30 and the tube 31 comprise a closed assembly which is charged either with a liquid which will vaporize at the operating temperature or is completely filled with a liquid which will expand when raised through the temperatures involved. It is necessary in working out the operation of this device to charge this assembly so that the temperature of the liquid in the percolator will remain in a fairly narrow range for eight or nine minutes before the bellows is expanded sufficiently to move the lever member 20 to throw the toggle switch to its "off" position. This can be readily accomplished by choosing a fluid having certain characteristics or regulating the quantity thereof to produce the desired results. Also, time is required to transfer heat from tube 31 to bellows 30 and the structure may be arranged so as to obtain a cooking or boiling temperature over any desired period before the circuit is opened.

The bellows member 30 being located externally of the case or body 1, heat is dissipated from the bellows and, therefore, operating conditions aid the result since the radiation loss is high and this radiation loss becomes greater as the temperature of the liquid within the percolator increases.

The operation of the device is simple and easily understood. In the form of toggle switch shown, a movement of the button or head 16 upwardly throws the switch to "on" position causing current to flow through the heating element to heat the liquid within the percolator. In the construction shown, the movement of the switch arm 14 causes the lever member 20 to compress the bellows to a limited extent. As the temperature of the liquid in the percolator rises, the liquid within the bellows 30 and tube 31 either vaporizes or expands gradually depressing the lever member 20 and eventually moving the operating link 19 sufficiently to snap the switch to "off" or "open" position.

This device is composed of a minimum number of parts, easy to manufacture and assemble and is accurately responsive to the desired thermal regulation.

What I claim is:

1. A device of the character described, including, a casing adapted to contain liquid and having an electric heating element therein, a switch for controlling the passage of electric current through said heating element, a bellows member positioned adjacent said casing, pivoted lever means adapted to abut said bellows member and a link member associated with said switch adapted to abut another portion of said lever means, said link member being provided with shoulders which are adapted to engage said lever means, whereby movement of said bellows member will cause said lever means to operate said switch to cut off the electric current after a predetermined heating.

2. A device of the character described, including, a casing adapted to contain liquid and having an electric heating element therein, a switch for controlling the passage of electric current through said heating element, a bellows member positioned adjacent said casing, pivoted lever means adapted to abut said bellows member and a link member associated with said switch adapted to abut another part of said lever means, said link member having a reduced end portion so as to provide shoulders, said lever means being provided with a platform having an aperture to receive said reduced end portion of the link, the shoulders being adapted to abut the platform adjacent said aperture, whereby movement of said bellows member will cause said lever means and link to operate said switch to cut off the electric current after a predetermined heating.

3. A device of the character described, including, a casing adapted to contain liquid and having an electric heating element therein, a switch for controlling the passage of electric current through said heating element, a switch casing for said switch, a lever pivoted to said switch casing, means connecting said switch to one end of said lever, a bellows member attached to said casing and associated with the other end of said lever, whereby movement of said bellows in one direction will actuate said lever and cause said switch to open.

4. A device of the character described, including, a receptacle, a partition therein forming a body adapted to contain liquid and a base member, an electric heating element on said partition in said body, a bellows member positioned beneath said partition and provided with tubular means extending through said partition into said body, a switch member for controlling the passage of electric current through said heating element, a lever means for connecting said bellows member and said switch, whereby movements of said bellows member are transferred to said switch member to operate the same.

5. A device of the character described, including, a receptacle, a partition therein forming a body adapted to contain liquid and a base member, an electric heating element on said partition in said receptacle, a bellows member positioned beneath said partition and provided with tubular means extending through said partition into said body, a switch member for controlling the passage of electric current through said heating element, a lever means for connecting said bellows member and said switch, said lever means including a link connected to said switch, whereby movements of said bellows member are transferred to said lever means and the link to operate the said switch.

6. A device of the character described, including, a casing adapted to contain liquid and having an electric heating element therein, a switch for controlling the passage of electric current through said heating element, a bellows member positioned adjacent said casing, means in said casing and associated with said bellows member for transferring heat from said casing to said bellows member, pivoted lever means adapted to abut said bellows member, and a link member associated with said switch adapted to abut another part of said lever means, whereby movement of said bellows member will cause said lever means to operate said switch to cut off an electric current after a predetermined heating.

7. A device of the character described, including, a casing adapted to contain liquid and having an electric heating element therein, a switch for controlling the passage of current through said electric heating element, a pivoted lever in said casing, an actuating link connected to said switch and adapted to abut said lever near one end thereof, a bellows member attached to said casing and provided with means projecting into said casing, said bellows member being pivotally connected to said lever, and said means projecting into said casing being adapted to transfer heat to said bellows member and cause expansion of said bellows member in one direction to move said lever and link and cause said switch to open after a predetermined heating period.

8. In a device of the character described, a casing adapted to contain liquid and having an electric heating element therein, switch means for controlling the passage of current through said heating element, an expansible and contractible member positioned adjacent said casing but not in contact with the liquid in said casing, said expansible and contractible member being provided with means projecting into said casing and in contact with the liquid in said casing which is to be heated, lever means between said expansible and contractible member and said switch means for operating said switch means by said expansible and contractible member.

9. A device of the character described, which includes, a casing adapted to contain liquid and having an electric heating element therein, a switch for controlling the passage of current through said electric heating element, a pivoted lever in said casing, a bellows member attached to said casing and being connected to said lever, an actuating link associated with said switch and having a loose connection with said lever so that said lever actuates said link in one direction only.

10. A device of the character described, which includes, a casing adapted to contain liquid to be heated, said casing having an electric heating element therein, a switch for controlling the passage of electric current through said electric heating element, a lever in said casing pivoted intermediate its ends, a bellows member attached to said casing and being connected to one end of said lever, an actuating link associated with said switch and having a loose connection with the other end of said lever whereby said lever actuates said link in one direction only to open said switch after a predetermined heating period.

RENÉ C. SAWYER.